United States Patent
Polak et al.

(10) Patent No.: US 11,629,413 B2
(45) Date of Patent: Apr. 18, 2023

(54) AMORPHOUS METAL STRIP AND METHOD FOR PRODUCING AN AMORPHOUS METAL STRIP

(71) Applicant: Vacuumschmelze GmbH & Co. KG, Hanau (DE)

(72) Inventors: Christian Polak, Blackenbach (DE); Thomas Strache, Frankfurt (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 21 days.

(21) Appl. No.: 16/992,536

(22) Filed: Aug. 13, 2020

(65) Prior Publication Data
US 2021/0047738 A1 Feb. 18, 2021

(30) Foreign Application Priority Data

Aug. 14, 2019 (DE) .................. 10 2019 121 946.9
Oct. 15, 2019 (DE) .................. 10 2019 127 776.0

(51) Int. Cl.
| | |
|---|---|
| C23F 17/00 | (2006.01) |
| C23F 1/02 | (2006.01) |
| H01F 1/153 | (2006.01) |
| C21D 9/52 | (2006.01) |
| C22C 45/00 | (2023.01) |
| F16F 1/02 | (2006.01) |
| B26B 19/38 | (2006.01) |

(52) U.S. Cl.
CPC .............. *C23F 1/02* (2013.01); *B26B 19/384* (2013.01); *C21D 9/52* (2013.01); *C22C 45/008* (2013.01); *C23F 17/00* (2013.01); *F16F 1/021* (2013.01); *H01F 1/153* (2013.01); *C21D 2201/03* (2013.01); *F16F 2224/0208* (2013.01); *F16F 2226/02* (2013.01); *F16F 2226/04* (2013.01); *F16F 2238/022* (2013.01); *F16F 2238/026* (2013.01)

(58) Field of Classification Search
None
See application file for complete search history.

(56) References Cited

U.S. PATENT DOCUMENTS

| | | | |
|---|---|---|---|
| 133,005 A | 11/1872 | Baggs | |
| 5,100,506 A | 3/1992 | Sturtevant et al. | |
| 5,460,687 A * | 10/1995 | Douglas | C23F 1/02 216/48 |
| 6,749,700 B2 | 6/2004 | Sunakawa et al. | |

(Continued)

FOREIGN PATENT DOCUMENTS

| | | |
|---|---|---|
| CN | 103160909 A * | 6/2013 |
| DE | 251001 A1 | 10/1987 |

OTHER PUBLICATIONS

English translation of CN 103160909 (originally published Jun. 19, 2013) obtained from PE2E search.*

(Continued)

*Primary Examiner* — George Wyszomierski
(74) *Attorney, Agent, or Firm* — Dickinson Wright PLLC

(57) ABSTRACT

A method for the production of a metal strip is provided. The method includes providing an amorphous metal strip having a first main surface and a second, opposing main surface. The first and/or the second main surface are treated with a wet-chemical etching process and/or a photochemical etching process.

28 Claims, 1 Drawing Sheet

(56) References Cited

U.S. PATENT DOCUMENTS

| | | |
|---|---|---|
| 7,235,910 B2 | 6/2007 | Decristofaro et al. |
| 7,965,966 B2 | 6/2011 | Kim et al. |
| 8,699,190 B2 | 4/2014 | Herzer |
| 2004/0085174 A1 | 5/2004 | Decristofaro et al. |
| 2004/0212269 A1* | 10/2004 | Decristofaro ............. H01F 3/02 310/216.065 |
| 2005/0046573 A1* | 3/2005 | Velasco .................. G06K 19/07 340/572.8 |
| 2005/0124136 A1* | 6/2005 | Piguet ..................... H01L 43/12 438/455 |
| 2005/0161429 A1 | 7/2005 | Sauciunac |
| 2008/0196795 A1* | 8/2008 | Waeckerle .......... H01F 41/0226 148/540 |
| 2014/0104024 A1* | 4/2014 | Herzer .................. C22C 33/003 335/297 |
| 2019/0133005 A1 | 5/2019 | Polak et al. |
| 2020/0377981 A1* | 12/2020 | Itagaki ................... C22C 1/002 |

OTHER PUBLICATIONS

Micrometal Broche, Excellence in Etching, available at least as early as Nov. 29, 2012.

* cited by examiner

AMORPHOUS METAL STRIP AND METHOD FOR PRODUCING AN AMORPHOUS METAL STRIP

This US patent application claims the benefit of German Patent Application No. 102019121946.9, filed Aug. 14, 2019, and German Patent Application No. 102019127776.0, filed Oct. 15, 2019, the entire contents of which is incorporated herein by reference for all purposes.

BACKGROUND

1. Technical Field

The invention relates to an amorphous metal strip and a method for producing an amorphous metal strip.

2. Related Art

Amorphous metal strips are produced, for example, using a melt spinning process. Such rapidly solidified materials intrinsically have excellent mechanical and soft magnetic properties and are thus frequently used, either as is or following appropriate heat treatment, as iron cores for inductive components, as disclosed in e.g. U.S. Pat. No. 8,699,190, or as shielding foils, as disclosed in e.g. US 2019/0 133 005 A, or as mechanical coil or leaf springs. In such applications the complete absence of a crystalline structure is an important factor.

In order to produce amorphous foils using rapid solidification technology, in particular a melt spinning process, a glass-forming metal alloy is first melted in a crucible made of an oxide ceramic (e.g. aluminium oxide) and/or graphite. Depending on the reactivity of the molten mass, the melting process may take place in air, in a vacuum or in an inert gas such as argon, for example. Once the alloy has melted at temperatures well above the liquidus point, the molten mass is injected through a casting nozzle with a slit-shaped outlet opening onto a rotating casting wheel made of a copper alloy. To this end, the casting nozzle is brought very close to the surface of the rotating copper cylinder at a distance of approx. 50 to 500 μm from it. The molten mass is pushed through this nozzle and then solidified on the moving copper surface at very high cooling rates of approx. $10^4$ K/s to $10^6$ K/s to form a continuous amorphous strip that detaches from the surface of the casting wheel and is wound in a continuous foil strip on a winding device. The maximum possible length of the foil strip is generally limited by the holding capacity of the crucible, which can range from a few kilogrammes to several tonnes depending on the size of the plant.

Nanocrystalline metal strips can be produced by heat treating the amorphous metal strips.

It is desirable for the amorphous or nanocrystalline metal strip to have low surface roughness in order to increase the fill factor of components such as laminated cores and coils made from the amorphous or nanocrystalline metal strip. DE 10 2010 036 401 A discloses a method in which the surface of the casting wheel on which the molten mass solidifies is continuously reshaped and smoothed by means of a rolling device during the casting process. In this way the fill factor of components can be increased, though further improvements remain desirable.

SUMMARY

An object is therefore to provide an amorphous metal strip with an even higher surface quality.

The invention provides a method for the production of a metal strip in which an amorphous metal strip is provided with a first main surface and a second, opposing main surface. The first main surface and/or the second main surface is/are treated using a wet-chemical etching process and/or a photochemical etching process. This improves the surface quality of the amorphous metal strip.

The present invention is based on the knowledge that the rapid solidification production process determines the surface quality of the strip it produces. Since this process basically involves the free solidification of a molten mass into a strip-shaped solid body, the surfaces of the strip are shaped according to the prevailing environmental conditions. As a result, the shape and material of the casting nozzle used and the shape and material of the casting wheel (cooling body) used both ultimately influence the surface quality on both sides of the rapidly solidified strip. The term "surface quality" covers the following characteristics: roughness, scoring, holes, pimples, cavities (air pockets), surface crystallinity, concavity, convexity, wedge-shapedness, etc. The rapid solidification process therefore determines the surface quality of the end product to a very large extent.

For example, wear on the surface of the casting wheel leads to increased roughness of the surface of the casting wheel during the casting process. As a result, the surfaces of the rapidly solidified strip undergo a change because the surface of the casting wheel is, as it were, mapped onto the material to be solidified during the solidification process. In addition, the rough surface of the casting wheel can cause the increased absorption of process gas into the molten metal droplets, thereby creating larger bas bubbles in the contact region between the molten droplets and the casting wheel.

During solidification of the molten mass these gas bubbles are frozen into the amorphous strip and can result in cavities (air pockets) or—particularly in thin foils—in hole-like defects in the solidified band.

A further undesirable surface quality feature is the partial surface crystallinity of an otherwise amorphous strip. In order to minimise wear on the casting wheel, it is desirable to choose a high-strength casting-wheel material. In the copper materials generally used in melting metallurgy, the properties of strength and thermal conductivity tend to act in opposite directions. For many alloys, however, it necessary to use casting-wheel materials with relatively high thermal conductivity in order to achieve sufficiently high cooling rates during foil production. Insufficiently high cooling rates cause surface crystallisation and in turn brittleness in the rapidly solidified foil.

Other production-related factors may also lead to surface defects including scoring in various directions, pimples, surface crystallinity, concavity, convexity and wedge-shapedness, for example.

Under normal circumstances, the strip surfaces of amorphous strips are not subjected to further treatment steps following casting, as is, for example, the case with crystalline strips or foils, which undergo subsequent rolling and even grinding at an intermediate thickness. A rolling process can be used to achieve crystalline strips or foils with a smooth and plane-parallel surface even where the strip solidified from the molten mass is initially very uneven or rough. In the case of crystalline strips, an additional grinding process at an intermediate thickness results in a far higher surface quality.

According to the invention, the surface of an amorphous metal strip or a nanocrystalline strip is further processed or subsequently treated by means of one or more etching processes in order to adjust and improve the surface quality, e.g. to reduce surface roughness.

The surface roughness of the metal strip can be measured using the value $R_a$ (the arithmetic mean). The evenness of metal strip and metal plate can be measured using the value $R_{max}$ (maximum roughness depth), which describes the vertical difference between the deepest valley and the highest peak over the entire measuring length. The aim is for the metal strip to have both $R_a$ and $R_{max}$ values that are as small as possible, e.g. $R_a<0.5$ μm and $R_{max}<5$ μm, preferably $R_a<0.3$ μm $R_{max}<3$ μm, preferably $R_a<0.2$ μm and $R_{max}<2$ μm, preferably $R_a<0.1$ μm and $R_{max}<1$ μm.

In an embodiment, the method for the production of a metal strip comprises the following:
  providing an amorphous metal strip having a first main surface and a second, opposing main surface, and
  wet-chemical etching the first and/or the second main surface.

This makes it possible to reduce unevenness, reduce or eliminate defects and reduce surface roughness.

In an embodiment, the entire surface of the first and/or the second main surface comes into contact with the etching fluid. In this embodiment, surface peaks, for example, are preferably etched and their height reduced in order to reduce surface roughness.

The first and/or second main surface is etched only superficially, e.g. only 1 μm from the surface, in order to provide a continuous strip with reduced surface roughness.

In an embodiment, the first and/or the second main surface are selectively etched, i.e. only certain regions of the surface are selected and etched. As an example, certain regions of the surface may be covered by a mask that is chemically resistant to the etching fluid at least for the length of the etching process. For example, valleys in the main surface are covered and not etched, while peaks in the main surface are not covered and can subsequently be removed by means of an etching process.

In an embodiment, a chemically resistant coating is further applied to at least parts of the first main surface and/or the second main surface and the first and/or second main surface is then wet-chemically etched, the regions of the first and/or second main surface not covered by the chemically resistant coating therefore being wet-chemically etched. This can reduce specific, local unevenness, reduce or remove specific, local defects and reduce surface roughness.

In an embodiment, the method for the production of a metal strip comprises the following:
  providing an amorphous metal strip with a first main surface and a second, opposing main surface, and
  photochemical etching of the first and/or the second main surface.

This makes it possible to reduce unevenness, reduce or remove defects and reduce surface roughness.

In an embodiment, a UV-light-sensitive or other light-sensitive coating is further applied to the first main surface and/or the second main surface and this coating is then exposed to light in such a manner as not to expose the regions to be etched. The exposed regions form an etching-resistant coating due to the action of the light. Once the unexposed regions have been removed using an appropriate solvent, the first and/or the second main surface is thus photochemically etched, regions of the first and/or second main surface that are not covered by the chemically resistant coating thus being photochemically etched. The etching-resistant coating is then removed using an alkaline solution, for example.

This makes it possible to reduce specific, local unevenness, to reduce or remove specific, local defects and to reduce surface roughness.

It is also possible to apply a UV-light-sensitive or other light-sensitive coating to the first main surface and/or the second main surface and then to expose this coating to light such that the regions to be etched are exposed. These exposed regions of the light-sensitive coating are removed using an appropriate solvent, for example, in order to create regions that are not covered by the rest of the light-sensitive but chemically resistant coating and can therefore be etched. In this embodiment, the unexposed regions of the light-sensitive coating form an etching-resistant or chemically resistant coating that can be removed after etching.

In an embodiment, the uncovered regions of the first and/or second main surface are photochemically etched away in order to separate at least a part of the strip.

Crystalline metal strips, nanocrystalline metal strips and amorphous metal foils can be structured using photochemical etching processes. This allows parts of any shape to be detached from these crystalline metal strips and amorphous metal foils. The photochemical etching of amorphous metal foils generally comprises the following steps: the application of a chemically resistant and laterally structured coating to one side of the amorphous metal foil and the etching of the non-coated areas of the metal with an appropriate etching fluid from the same side. The other side of the amorphous metal foil can also be coated with a chemically resistant layer. In this case, the lateral structuring is produced in a known manner by the application of a light-sensitive coating or foil. This coating or foil is then exposed to light in such a manner that the regions to be etched remain unexposed. Exposing this coating or foil to light creates a resistance to etching. The unexposed regions of the coating or foil are then removed by means of an appropriate solvent. This is followed by photochemical etching in which the etching solution acts on the non-covered regions only. Finally, the etching-resistant coating is then also removed using an alkaline solution, for example. Photochemical etching may be integrated into a continuous reel-to-reel process.

Alternatively, a UV-light-sensitive or other light-sensitive coating may be applied to the first main surface and/or the second main surface, the regions to be etched being exposed to light and then removed. These exposed regions of the light-sensitive coating are removed using an appropriate solvent, for example, in order to create regions that are not covered by the remaining light-sensitive but chemically resistant coating and can therefore be etched. In this embodiment, the unexposed regions of the light-sensitive coating form an etching-resistant or chemically resistant coating that is not removed until etching is complete.

Photochemical etching processes such as those disclosed in US 2004/0085174 A1 and U.S. Pat. No. 7,235,910 B2, for example, may be used. These photochemical etching processes have advantages in terms of the formation of edge geometries with no burrs of the type generally produced by other cutting or stamping processes. Photochemical etching processes like those disclosed in U.S. Pat. No. 5,100,506 and US 2005/0161429 A1, which can be used to produce specific cutting tools with good cutting edges, can also be used for amorphous metal strips.

Surface defects on the surface of crystalline metal strips and amorphous metal foils can be characterised by means of commercially available optical inspection systems. These systems provide data on the type of surface defect (e.g. pimples, holes, etc.) and on their length and size. These systems can be integrated into reel-to-reel processes and can transmit results online or to databases. The cross sections of metal foils can be determined using appropriate, commercially available profilometers. Fixed to a C-bracket, two sensors measure the distance to either side of the strip locally. These sensors are generally confocal systems, triangulation sensors, capacitive sensors or mechanical sensors. The two sensors are moved over the strip laterally, i.e. transversely to the strip direction, to determine a thickness profile. Corresponding measurement devices can be integrated into a reel-to-reel process and provide data on the profile and on the local thickness of the metal foils. Surface roughness can be determined by means of commercially available surface roughness measuring devices, which can also be integrated in a reel-to-reel process.

In an embodiment, one or both of a surface inspection and a cross-section inspection of the amorphous metal strip is also carried out. For example, the first and/or the second main surface may be examined visually or optically. The method could include visually examining a surface and/or performing a cross-section inspection of the amorphous metal strip, or optically examining a surface and/or performing a cross-section inspection of the amorphous metal strip, or placing a profilometer on the first and/or the second main surface of the amorphous metal strip that contacts the first and/or second main surface of the amorphous strip to examine the surface and/or cross-section of the amorphous metal strip.

In an embodiment, a method for producing a metal strip is provided. The method comprises providing an amorphous metal strip having a first main surface and a second, opposing main surface, inspecting a surface and/or cross-section of the first and/or the second main surface of the amorphous metal strip, applying a chemically resistant coating to at least parts of the first main surface and/or the second main surface, and photochemical etching and/or wet-chemical etching the first and/or the second main surface, wherein regions of the first and/or second main surface that are uncovered by the chemically resistant coating are etched.

In some embodiments, the entire first and second main surfaces of the amorphous metal strip are wet-chemical etched and afterwards the chemically resistant coating is applied to at least parts of the first main surface and/or the second main surface.

In some embodiments, the method further comprises identifying defects in the first main surface and/or second main surface and applying the chemically resistant coating such that the defects are uncovered by the chemically resistant coating and remaining regions of the first main surface and/or second main surface are covered by the chemically resistant coating, wherein the defects are etched.

In some embodiments, the chemically resistant coating is selectively applied to the first main surface and/or the second main surface such that the defects are uncovered by the chemically resistant coating.

In some embodiments, the chemically resistant coating is selectively applied by printing.

In some embodiments, the chemically resistant coating comprises a photosensitive material and is selectively illuminated by light, wherein the regions which are not illuminated by light are removed to uncover the defects.

In some embodiments, the uncovered regions of the first and/or second main surface are etched away to remove at least a part of the strip and to reduce the surface roughness $R_a$ (the arithmetic mean of the surface roughness) and/or $R_{max}$ (the maximum roughness depth, which describes the vertical difference between the deepest valley and the highest peak.)

In some embodiments, the inspecting a surface and/or cross-section of the first and/or the second main surface of the amorphous metal strip comprises visually examining a surface and/or performing a cross-section inspection of the amorphous metal strip.

In some embodiments, the inspecting a surface and/or cross-section of the first and/or the second main surface of the amorphous metal strip comprises optically examining a surface and/or performing a cross-section inspection of the amorphous metal strip.

In some embodiments, the inspecting a surface and/or cross-section of the first and/or the second main surface of the amorphous metal strip comprises placing a profilometer on the first and/or the second main surface of the amorphous metal strip that contacts the first and/or second main surface of the amorphous strip to examine the surface and/or cross-section of the amorphous metal strip.

In some embodiments, the method further comprises removing the chemically resistant coating.

In some embodiments, the method further comprises forming a manufactured part from the etched amorphous metal strip, wherein the manufactured part is one or more of the group consisting of a coil spring, a leaf spring, a mechanical and magnetic spring, a blade, a shaving foil, a part comprising scratch-resistant and cut-resistant surfaces, a bendable protective sheathing, a planar single-layer inductor, a layer of a stacked, multi-layer planar inductor, a layer of a stacked, multi-layer, annular planar inductor and a part of an inductive component.

In an embodiment, the method for the production of a metal strip comprises the following:
 the provision of an amorphous metal strip having a first main surface and a second, opposing main surface,
 the surface and cross-section inspection of the amorphous metal strip, followed by the wet-chemical surface treatment, e.g. the wet-chemical etching, of the first and/or second main surface of the amorphous metal strip, followed by
 the lateral photochemical etching of the first and/or second main surface of the amorphous metal strip.

This method can be used to reduce or remove unevenness and defects and to reduce surface roughness. Surface roughness can be reduced step by step by carrying out a plurality of consecutive etching processes.

This method can be carried out as part of a single- or multi-step reel-to-reel process.

In magnetic and mechanical applications of amorphous strip-shaped materials any type of surface defect (defect of form) results in a deterioration of intrinsic material properties. The method according to the invention therefore makes it possible to provide metal strips and parts with improved material properties.

One such example is the considerable reduction in fill factor (lamination factor, stacking factor) caused by rough, pimpled and uneven strip surfaces in magnetic applications. A considerable reduction in fill factor can cancel out the advantages presented by alloys with higher saturation flux densities and higher permeabilities. The method according to the invention therefore makes it possible to provide components with an improved fill factor.

In the field of mechanical applications, rough, pimpled and uneven strip surfaces result in a reduction in elongation at break and bending-fatigue strength. This is particularly apparent from the fact that in tensile tests on amorphous strips breaking is very likely to occur within the Hooke's region. Innumerable load tests carried out on either strips cast to final width or strips cut from wider strips cast to final width have shown that the strips tear at a boundary stress that can time and again be ascribed to the linear behaviour of σ=Eε (Hooke's law where σ=strip tension, E=modulus of elasticity, ε=elongation where ε=Δl/l$_o$). It would appear impossible to achieve or exceed the elasticity limit owing to surface defects (air pockets and hole-like defects, scoring in various directions, pimples, surface crystallinity, concavity, convexity, wedge-shapedness) and defects on edges and cutting edges (edge damage, cracks, cutting burrs, kinds) of the strip, which constitute starting points for the formation of breaks and the formation and continuation of cracks due to stress concentration and notch effects. These defects on surfaces and edges form so-called "pre-determined breaking points". Material failure (strip tears and component breaks) does not occur until strips are subjected to loads during testing (load, pressure and tensile testing, etc.) or used in product form (e.g. springs). The mechanical properties of the metal strips according to the invention are thus improved.

The dimensions of amorphous strip defects, which typically exhibit a thickness of 10 μm to 100 μm, have an order of magnitude of micrometres and can in some cases only be detected under a microscope. For example, the lateral extent of pockets and hole-like defects on the strip surface ranges from 50 μm to 500 μm, pimples and cutting burrs rise between 1 μm and 20 μm from the strip surface, defects caused by concavities, convexities and wedge-shapedness range from 1 μm to 10 μm and surface crystallinity generally occurs at points on a surface and extends up to 0.5 μm into the bulk. The method according to the invention either removes or reduces the size of defects of this type.

The object of the method according to the invention is therefore to remove as far as possible all defects on both surfaces and all defects on all edges in order to provide smooth, plane-parallel amorphous plates or strips. These smooth plane-parallel amorphous plates and strips have the following advantages:
- reduced risk of breaking or tearing when forming or bending the plate
- increased elongation at break by avoiding notch effects
- increased bending-fatigue strength
- increased fill factor for magnetic applications when stacking rings or plates for planar inductors
- improved transition to ferromagnetic saturation and reduced coercive field H$_e$.

In an embodiment, the amorphous metal strip is further produced using a rapid solidification technology. For example, a molten mass made of an alloy with a metalloid content of 15 atomic % to 30 atomic % is cast onto a moving outer surface of a moving cooling body, the molten mass solidifying on the outer surface and the amorphous metal strip being formed.

In an embodiment, the outer surface of the cooling element is reshaped continuously in order to smooth the outer surface of the cooling element, while the molten mass is cast onto the moving outer surface of the cooling element.

The outer surface may, for example, be reshaped by a rolling device and thus smoothed, or be processed by means of polishing or grinding or using brushes.

A nanocrystalline metal strip can be provided by heat treating the amorphous metal strip. The heat treatment may take place before, during or after amorphous metal strip surface and cross-section inspection, wet-chemical surface treatment or lateral photochemical etching steps.

Heat treatment can be carried out at a temperature T$_a$, where 450° C. T$_a$ 750° C., in order to generate a nanocrystalline structure in the foil in which at least 80 vol. % of the grains have an average size of less than 100 nm.

The amorphous metal strip can be continuously heat treated under tensile stress.

The metal strip can be drawn or pulled continuously through a continuous furnace at a speed s such that the foil dwell time in a zone of the continuous furnace with a temperature T$_a$ is between two seconds and 10 minutes. The metal strip can be continuously heat treated under a tensile stress of 1 MPa to 1000 MPa.

In an embodiment, the amorphous metal strip has the following alloy composition and incidental impurities:

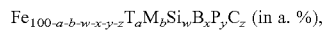
Fe$_{100-a-b-w-x-y-z}$T$_a$M$_b$Si$_w$B$_x$P$_y$C$_z$ (in a. %),

T denoting one or more of the elements in the group consisting of Co, Ni, Cu, Cr and V, M denoting one or more of the elements in the group consisting of Nb, Mo and Ta, and where $0 \leq a \leq 70$ $0 \leq b \leq 9$ $0 \leq w \leq 18$ $5 \leq x \leq 20$ $0 \leq y \leq 7$ $0 \leq z \leq 2$.

A total of up to 0.5 wt. % incidental impurities may be present, preferably up to 0.2 wt. %, preferably up to 0.1 wt. %. In addition to other incidental impurities, up to 0.1 wt. % aluminium, up to 0.05 wt. % sulphur, up to 0.1 wt. % nitrogen and/or up to 0.1 wt. % oxygen may be present.

An amorphous metal strip with reduced unevenness and/or reduced surface defects and/or reduced surface roughness and reduced boundary and edge defects is therefore provided.

The amorphous metal strip may have:
- a width of 2 mm to 300 mm, preferably 40 mm to 300 mm, and/or
- a thickness of less than 50 μm, preferably less than 25 μm, preferably less than 20 μm, preferably between 10 μm and 18 μm, and/or
- a continuous length of at least 2 km or at least 8 km.

The amorphous metal strip may have the following alloy composition and incidental impurities:

Fe$_{100-a-b-w-x-y-z}$T$_a$M$_b$Si$_w$B$_x$P$_y$C$_z$ (in at. %),

T denoting one or more of the elements in the group consisting of Co, Ni, Cu, Cr and V, M denoting one or more of the elements in the group consisting of Nb, Mo and Ta, and where $0 \leq a \leq 70$ $0 \leq b \leq 9$ $0 \leq w \leq 18$ $5 \leq x \leq 20$ $0 \leq y \leq 7$ $0 \leq z \leq 2$.

A total of up to 0.5 wt. % incidental impurities may be present, preferably up to 0.2 wt. %, preferably up to 0.1 wt. %. In addition to other incidental impurities, up to 0.1 wt. % aluminium, up to 0.05 wt. % sulphur, up to 0.1 wt. % nitrogen and/or up to 0.1 wt. % oxygen may be present.

A smooth, plane-parallel amorphous metal plate with reduced unevenness and/or reduced surface defects and/or reduced surface roughness and reduced boundary and edge defects is therefore provided.

The surface roughness of the metal strip and the metal plate can be measured using the value $R_a$. The evenness of the metal strip and the metal plate can be measured using the value $R_{max}$. The aim is for the amorphous metal plate to have both $R_a$ and $R_{max}$ values that are as small as possible, e.g. $R_a<0.5$ μm and $R_{max}<5$ μm, preferably $R_a<0.3$ μm and $R_{max}<3$ μm, preferably $R_a<0.2$ μm and $R_{max}<2$ μm, preferably $R_a<0.1$ μm and $R_{max}<1$ μm.

The metal plate may have:
a width of 2 mm to 300 mm, preferably 40 mm to 300 mm, and/or
a thickness of less than 50 μm, preferably less than 25 μm, preferably less than 20 μm, preferably between 10 μm and 18 μm.

The metal plate may have the following alloy composition and incidental impurities:

$Fe_{100-a-b-w-x-y-z}T_aM_bSi_wB_xP_yC_z$ (in at. %),

T denoting one or more of the elements in the group consisting of Co, Ni, Cu, Cr and V,
M denoting one or more of the elements in the group consisting of Nb, Mo and Ta, and
where $0 \leq a \leq 70$ $0 \leq b \leq 9$ $0 \leq w \leq 18$ $5 \leq x \leq 20$ $0 \leq y \leq 7$ $0 \leq z \leq 2$.

A total of up to 0.5 wt. % incidental impurities may be present, preferably up to 0.2 wt. %, preferably up to 0.1 wt. %. In addition to other incidental impurities, up to 0.1 wt. % aluminium, up to 0.05 wt. % sulphur, up to 0.1 wt. % nitrogen and/or up to 0.1 wt. % oxygen may be present.

The amorphous metal strip may have various compositions. In order for it to be possible to produce a metal or an alloy as an amorphous foil or strip using a rapid solidification technology, the metal foil or strip must contain one or more glass-forming elements such as Si, B, P or C. These glass-forming elements are also referred to as metalloids. The percentage of glass-forming elements may range from 15 at. % to 30 at. %, where at. % denotes atomic percent.

In an embodiment, the amorphous metal strip is an iron-based metal foil with a metalloid content of 15 to 30 at. %.

In an embodiment, the amorphous iron-based metal has a composition $(Fe,T)_aM_b$, where 70 at. $\% \leq a \leq 85$ at. % and 15 at. $\% \leq b \leq 30$ at. %, T is one or more of the elements Co, Ni, Mn, Cu, Nb, Mo, Cr, Zn, Sn and Zr, and M is one or more of the elements B, Si, C and P.

The amorphous metal strip has a structure that is at least 80 vol. % amorphous or consists of at least 50 vol. %, preferably 80 vol. %, nanocrystalline grains, of which at least 80 vol. % have an average grain size of less than 100 nm and random orientation.

In an embodiment, the casting wheel side of the metal strip has a surface roughness with an arithmetical mean $R_a$ of less than 0.8 μm, preferably less than 0.7 μm.

The wedge-shapedness or convexity can be measured at the strip cross section or at the cross section of the metal plate that has been separated from the metal strip. If, for example, the thickness to be assigned to the cross section of one side of the strip is $d_1$ and the thickness to be assigned to the cross section of the other side of the strip is $d_2$, the wedge-shapedness can be taken to be the difference between the two thicknesses=absolute value $(d_2-d_1)$. The aim is to keep the wedge-shapedness as small as possible. For example, the wedge-shapedness is <5 μm, preferably <4 μm, preferably <3 μm, preferably <2 μm, preferably <1 μm.

In an embodiment, the amorphous metal strip undergoes first a surface and cross-section inspection, followed by wet-chemical surface treatment, e.g. wet-chemical etching, of the first and/or second main surface of the amorphous metal strip, optionally followed by lateral photochemical etching of the first and/or second main surface of the amorphous metal strip.

The unique combination of these three processes ensures that the smooth, plane-parallel plates used for the application have a reduced risk of breaking or tearing when forming or bending the plate, increases the elongation at break and the bending-fatigue strength of the plate, increases the fill factor for magnetic applications when stacking rings or plate, and results in an improved transition to ferromagnetic saturation and a reduction in coercive field $H_c$.

The final products of the process chain described are parts that are ultimately detached from the continuous strip. Surface defects and edge defects in these parts are significantly reduced or entirely eliminated by the chain of processes described.

Uses for smooth, plane-parallel, amorphous plates for mechanical applications include:
coil springs
leaf springs
a combination of mechanical and magnetic springs
blades
shaving foils
scratch-resistant and cut-resistant surfaces, bendable protective sheathing.

Uses for smooth, plane-parallel, amorphous plates for magnetic applications include:
planar (single-layer) inductors
stacked, multi-layer planar inductors
stacked, multi-layer, annular planar inductors
inductive components.

A number of embodiments are described below with reference to the drawings.

DETAILED DESCRIPTION OF EXAMPLE EMBODIMENTS

Figure 1:
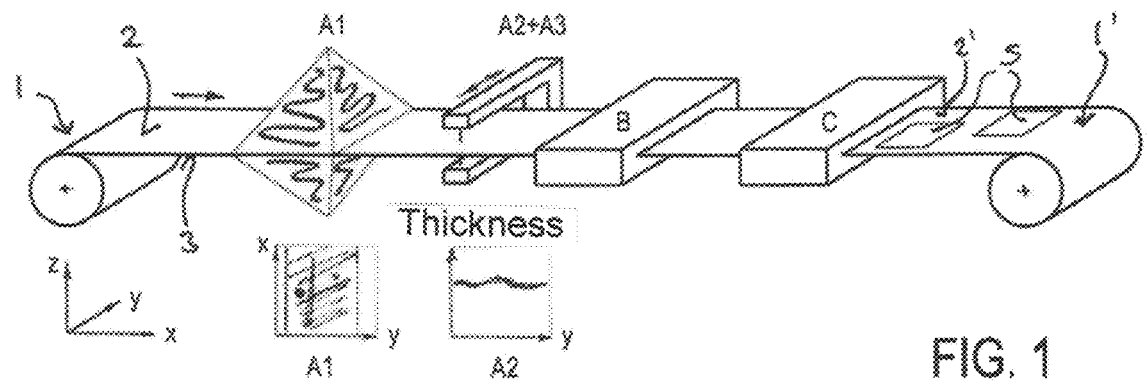
FIG. 1 shows a schematic representation of a chain of processes for a reel-to-reel process.

FIG. 1 shows a schematic representation of a chain of processes for a reel-to-reel process for the production of a metal strip, in particular for the subsequent treatment of an amorphous or nanocrystalline metal strip 1. The metal strip 1 has a first main surface 2 and an opposing, second main surface 3 and has been produced as an amorphous strip or amorphous foil using a rapid solidification technology. Typically, the first main surface 2 is the side of the strip that solidified open to the air, while the second main surface 3 is the side of the strip that was in contact with the casting wheel.

The reel-to-reel process according to this embodiment features continuous surface inspection (A1) of both sides of the strip, measurement of the strip profile (A2) and measurement of the surface roughness (A3) as well as a wet-chemical surface treatment process (B) and a lateral photochemical etching process (C) for lateral shaping. The result is a metal strip 1' that is smoother and more plane-parallel. In addition, this metal strip 1' can be used to make smooth, plane-parallel amorphous plates 5.

The continuous surface inspection (A1) supplies images (x-y dimension) and position and size data on surface defects from both sides of the strip. Determining the strip profile (A2) provides the local thickness as a function of the lateral strip position y.

The process chain shown in FIG. 1 and described below can be used to produce specific smooth, plane-parallel amorphous plates 5 from amorphous metal strips or metal foils 1. The process chain may be one single reel-to-reel process or divided into a plurality of reel-to-reel processes.

Initially, the amorphous metal foil 1 undergoes a surface and cross-section inspection (A). To this end, the strip material 1 is subjected to a continuous surface inspection (A1) from both sides 2, 3 once it has been unwound from the start reel and is characterised in terms of surface defects (pimples, scoring, holes, etc.). Immediately before or after this, the strip profile (A2) and surface roughness are measured (A3) either continuously or at discrete intervals using a profilometer. The following data can be recorded during A and saved to a database: pimples, holes, scoring in various directions, thickness and shape of strip cross section and surface roughness. This data is used to control all the following processes in a spatially resolved manner. The data obtained may be spatially resolved and provide information about the extent of the defect.

The lateral and vertical extents of problematic surface defects are reduced in a wet-chemical surface treatment process (B). To this end, surface material is removed completely or selectively using a controlled etching process. The surface material can be removed from both sides of the strip, i.e. a) from the side 3 of the strip that was in contact with the casting wheel and b) from the side 2 of the strip that solidified open to the air. The following methods can be used singly or together or consecutively: the complete etching of the strip (B1) from one (FIG. 2) or both sides of the strip 2, 3, as shown schematically by the arrows 10; the filling of cavities or indentations 6 (FIG. 3) with a chemically resistant coating 7 (B2) and/or the application of a chemically resistant coating 7 around vertically projecting defects 8 (FIG. 4) (B3) and the subsequent etching away of uncovered areas 8, or the application of etching fluid 9 (FIG. 5) to the vertically projecting defects only 8 (B4).

The etching processes described in B require a knowledge of the lateral position and the lateral and vertical extent of the defects, e.g. the indented sections 6 and raised sections 8, and an etching process that is controlled in terms of time and quantity of etching fluid. The size of the surface treated depends on the way the process is conducted and may range from 1 mm$^2$ to 100,000 cm$^2$. Optionally, the strip that is wet-chemically treated in B can be subject to a further surface and cross-section inspection A. The process B can be carried out a plurality of times until the desired surface quality, e.g. reduced unevenness, reduced surface defects and reduced surface roughness, is achieved. In particular, optically undetectable crystals close to the surface can be removed by the separate, global etching of the strip 1 from one or both 2, 3 sides (B1). The process B may be dispensed with locally if the amorphous metal foil already has the desired surface quality locally.

After the wet-chemical etching process (B), a photochemical etching process C can be carried out in order to produce a smoother surface 2' and/or 3'. The lateral shaping of the smooth, plane-parallel amorphous plate 5 takes place during the lateral photochemical etching process (C). First a chemically resistant and laterally structured coating of any shape is applied to one side, e.g. the main surface 2, of the amorphous metal foil 1, then the non-coated areas of the metal foil are etched through from the same side with an appropriate etching fluid. The other side of the amorphous metal foil, e.g. the second main surface 3, can also be covered with a chemically resistant coating. The photochemical etching takes place in a continuously running reel-to-reel process. The aforementioned chemically resistant and laterally structured coating is applied such that the positions of the plates 5 to be etched from it are continuously adjusted locally using the results of the surface and cross-section inspection (A). In particular, every effort is made to ensure that the plates are free of defects and have the least possible roughness and a plane-parallel cross section.

The unique combination of processes A+B+C ensures that the smooth, plane-parallel plates 5 used for the application have a reduced risk of breaking or tearing when the plate is being formed or bent, that the elongation at break and bending-fatigue strength of the plate 5 are increased, that the fill factor is increased for magnetic applications when stacking rings or plates, that transition to ferromagnetic saturation is improved and coercive field $H_c$ is reduced.

In other embodiments, either the wet-chemical etching process B or the photochemical etching process C may be used alone. It would also be possible to omit the optical inspection included in method A if the surface quality of the metal strip 1' treated were sufficient for the planned application. It would also be possible to repeat the entire process, i.e. processes A+B+C, or to repeat one or more of these processes. For example, processes A and/or B could be repeated several times and followed by process C, carried out only once.

Figure 2:
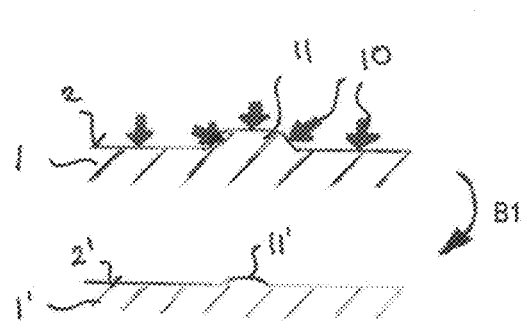
FIG. 2 shows a schematic representation of a wet-chemical surface treatment process involving the complete etching of the strip.

Various etching processes B are schematically represented in FIGS. 2 to 5. FIG. 2 shows a schematic representation of a wet-chemical surface treatment process involving the complete etching of the strip 1 from either one or both sides of the strip 2, 3. As represented schematically by the arrows 10, the etching fluid removes a layer close to the surface, thereby reducing or even entirely eliminating the lateral and vertical extent of vertically projecting surface defects 11, as indicated by reference numeral 11'. This occurs because the etching fluid is able to attack the material of the vertically projecting surface defects 11 both from above and from the side and that these surface defects are etched in preference to flatter regions of the surface. The etching process is controlled in terms of time and the quantity of etching fluid such that material is removed from the surface over a vertical range corresponding to the smallest or the largest (or an intermediary) original height of the project defects 11 within the area treated.

Figure 3:
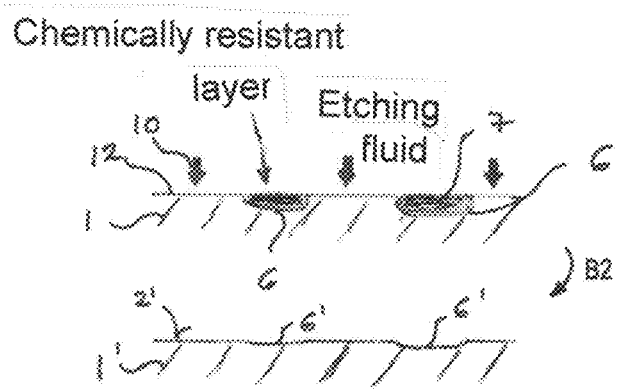
FIG. 3 shows a schematic representation of a wet-chemical surface treatment process involving the filling of cavities with a chemically resistant coating and the subsequent etching away of the uncovered areas.

FIG. 3 shows a schematic representation of a wet-chemical surface treatment process involving the filling of cavities 6 with a chemically resistant coating 7 and the subsequent etching away of the uncovered areas 12, as schematically represented by the arrows 10. The result is a surface 1' with cavities 6' that are clearly flatter and even completely eliminated. The etching process is controlled in terms of time and quantity of etching fluid, as represented schematically by the arrows 10, such that material is removed from the surface over a vertical range corresponding to the smallest or the largest (or an intermediate) original depth of the cavities 6 within the area treated.

Figure 4:
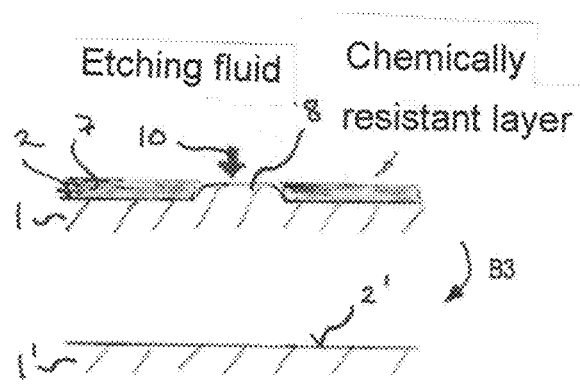
FIG. 4 shows a schematic representation of a wet-chemical surface treatment process involving the application of a chemically resistant coating around vertically projecting defects and the subsequent etching away of the uncovered areas.

FIG. 4 shows a schematic representation of a wet-chemical surface treatment process involving the application of a chemically resistant coating 7 around vertically projecting defects 8 and the subsequent etching away of the uncovered areas, i.e. the projecting defects 8. The result is a metal strip 1' with a surface 2' and/or a surface 3' with clearly flatter projecting defects or even a surface with no projecting defects at all. The etching process is controlled in terms of time and quantity of etching fluid, as represented schematically by arrow 10, such that material is removed from the surface over a vertical range corresponding to the smallest or the largest (or an intermediate) original height of the projecting defects within the area treated.

Figure 5:
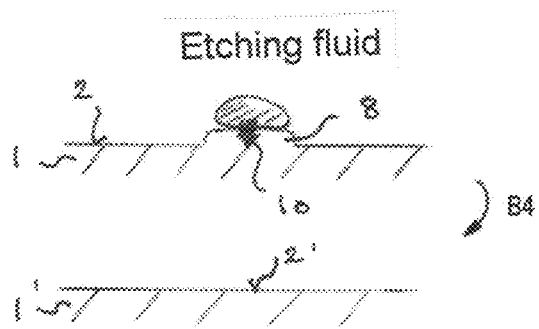
FIG. 5 shows a schematic representation of a wet-chemical surface treatment process involving the application of etching fluid to vertically projecting defects only.

FIG. 5 shows a schematic representation of a wet-chemical surface treatment process involving the application of etching fluid 9 to vertically projecting defects 8 only. The result is a metal strip 1' with a surface 2' and/or a surface 3' with clearly flatter projecting defects or even a surface with no projecting defects at all. The etching process is controlled in terms of time, location, extent and quantity of etching fluid (arrow 10) such that material is removed from the surface over a vertical range corresponding to the smallest or the largest (or an intermediate) original height of the projecting defects within the area treated.

The end products of the chain of processes described are parts 5 or plates that are ultimately detached from the continuous strip 1'. The chain of processes described significantly reduces or completely removes surface defects and edge defects from these parts 5.

These smooth, plane-parallel, amorphous plates 5 can be used for mechanical applications such as:
coil springs
leaf springs
combinations of mechanical and magnetic springs
blades
shaving foils
scratch-resistant and cut-resistant surfaces, protective sheathing and/or for magnetic applications such as:
planar (single-layer) inductors
stacked, multi-layer planar inductors
stacked, multi-layer, annular planar inductors
inductive components.

The improvements in both mechanical properties and magnetic properties can be advantageous in magnetic applications.

The invention claimed is:

1. A method for producing a metal strip, comprising:
providing an amorphous metal strip having a first main surface and a second, opposing main surface,
inspecting a surface and/or cross-section of the first and/or the second main surface of the amorphous metal strip using an optical inspection system and/or a profilometer,
wet chemical etching the entire first and second main surfaces of the amorphous metal strip;
after the wet chemical etching of the entire first and second main surfaces of the amorphous metal strip, covering at least parts of the first main surface and/or at least parts of the second main surface with a first chemically resistant coating, wherein the first chemically resistant coating is chemically resistant to etching fluid for the length of the etching process,
wet-chemical etching at least one region of the first main surface which is not covered by the chemically resistant coating and/or at least one region of the second main surface which is not covered by the first chemically resistant coating, wherein the etching removes at least a part of the amorphous metal strip and reduces the surface roughness $R_a$ and/or $R_{max}$, and
removing the first chemically resistant coating from the amorphous metal strip,
photochemical etching the amorphous metal strip by applying a second chemically resistant and lateral structured coating to the first main surface of the amorphous metal strip,
etching through non-coated areas of the amorphous metal strip from the first main surface with an etching fluid, wherein the second chemically resistant coating is chemically resistant to the etching fluid for the length of the etching process, and
forming at least one part from the amorphous metal strip.

2. A method according to claim 1, wherein the inspecting a surface and/or cross-section of the first and/or the second main surface of the amorphous metal strip comprises:
visually examining a surface and/or performing a cross-section inspection of the amorphous metal strip,
optically examining a surface and/or performing a cross-section inspection of the amorphous metal strip,
or placing a profilometer on the first and/or the second main surface of the amorphous metal strip that contacts the first and/or second main surface of the amorphous strip to examine the surface and/or cross-section of the amorphous metal strip.

3. A method according to claim 1, wherein the method is carried out as part of a single- or multi-step reel-to-reel process.

4. A method according to claim 1, further comprising: producing the metal strip using a rapid solidification technology.

5. A method according to claim 4, wherein the amorphous metal strip is formed by casting a molten mass made of an alloy with a metalloid content of 15 at. % to 30 at. % onto a moving outer surface of a moving cooling body, the molten mass solidifying on the outer surface and forming the amorphous metal strip.

6. A method according to claim 5, wherein the outer surface of the cooling body is continuously processed in order to smooth the outer surface of the cooling body while the molten mass is cast on the moving outer surface of the cooling body.

7. A method according to claim 5, the amorphous metal strip having the following alloy composition and up to 0.5 wt. % incidental impurities:

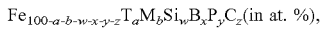$\mathrm{Fe}_{100-a-b-w-x-y-z}\mathrm{T}_a\mathrm{M}_b\mathrm{Si}_w\mathrm{B}_x\mathrm{P}_y\mathrm{C}_z$(in at. %), T denoting one or more of the elements in the group consisting of Co, Ni, Cu, Cr and V,
M denoting one or more of the elements in the group consisting of Nb, Mo and Ta, and
where $0 \le a \le 70$, $0 \le b \le 9$, $0 \le w \le 18$, $5 \le x \le 20$, $0 \le y \le 7$, and $0 \le z \le 2$.

8. A method according to claim 1, further comprising: heat treating the amorphous metal strip in order to transform the amorphous metal strip to a nanocrystalline state.

9. A method according to claim 8, wherein the heat treatment is carried out at a temperature $T_a$, where $450°$ C.$\le T_a \le 750°$ C., in order to produce a nanocrystalline structure in the metal strip in which at least 80 vol. % of the grains have a size of less than 100 nm.

10. A method according to claim 9, wherein the metal strip is continuously heat treated under tensile stress of 1 MPa to 1000 MPa.

11. A method according to claim 10, wherein the metal strip is pulled continuously through a continuous furnace at a speed s such that a dwell time of the metal strip in a zone of the continuous furnace with a temperature $T_a$ is between two seconds and 10 minutes.

12. A method according to claim 1, the amorphous metal strip having the following alloy composition and up to 0.5 wt. % incidental impurities:

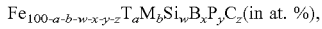$\mathrm{Fe}_{100-a-b-w-x-y-z}\mathrm{T}_a\mathrm{M}_b\mathrm{Si}_w\mathrm{B}_x\mathrm{P}_y\mathrm{C}_z$(in at. %), T denoting one or more of the elements in the group consisting of Co, Ni, Cu, Cr and V,
M denoting one or more of the elements in the group consisting of Nb, Mo and Ta, and
where $0 \le a \le 70$, $0 \le b \le 9$, $0 \le w \le 18$, $5 \le x \le 20$, $0 \le y \le 7$, and $0 \le z \le 2$.

13. A method according to claim 1 including identifying defects in the first main surface and/or second main surface, wherein the defects include at least one of air pockets, hole-like defects, scoring in various directions, pimples, surface crystallinity, concavity, convexity, wedge-shapedness, edge damage, cracks, and cutting burrs; the covering step includes applying the first chemically resistant coating such that the defects are uncovered by the chemically resistant coating and remaining regions of the first main surface and/or second main surface are covered by the chemically resistant coating, and the wet-chemical etching of at least one region includes wet etching the defects.

14. A method according to claim 13, wherein the covering step includes selectively applying the first chemically resistant coating to the first main surface and/or the second main surface such that the defects are uncovered by the chemically resistant coating.

15. A method according to claim 14, wherein the first chemically resistant coating is selectively applied by printing.

16. A method according to claim 1, wherein the second chemically resistant coating comprises a photosensitive material and is selectively illuminated by light, wherein regions of the second chemically resistant coating which are not illuminated by light are removed to uncover defects, wherein the defects include at least one of air pockets, hole-like defects, scoring in various directions, pimples, surface crystallinity, concavity, convexity, wedge-shapedness, edge damage, cracks, and cutting burrs, and the etching through non-coated areas includes wet etching the defects.

17. A method according to claim 1, further comprising forming a manufactured part from the etched amorphous metal strip, wherein the manufactured part is one or more of the group consisting of a coil spring, a leaf spring, a mechanical and magnetic spring, a blade, a shaving foil, a bendable protective sheathing, a planar single-layer inductor, a layer of a stacked, multi-layer planar inductor, a layer of a stacked, multi-layer, annular planar inductor and a part of an inductive component.

18. A method according to claim 1, wherein the photochemical etching takes place in a continuously running reel-to-reel process.

19. A method according to claim 1, wherein the second chemically resistant and lateral structured coating is applied such that positions of plates to be etched from the amorphous metal strip are adjusted locally using results of the surface and/or cross-section inspection.

20. A method according to claim 1, wherein the surface is continuously inspected and a profile of the amorphous metal strip and the surface roughness are measured continuously or at discrete intervals using the profilometer.

21. A method for producing a metal strip, comprising:
providing an amorphous metal strip having a first main surface and a second, opposing main surface,
inspecting a surface and/or cross-section of the first and/or the second main surface of the amorphous metal strip using an optical inspection system and/or a profilometer,
covering at least parts of the first main surface and/or at least parts of the second main surface with a first chemically resistant coating, wherein the first chemically resistant coating is chemically resistant to etching fluid for the length of the etching process,
wet-chemical etching at least one region of the first main surface which is not covered by the first chemically resistant coating and/or at least one region of the second main surface which is not covered by the chemically resistant coating, wherein the etching removes at least a part of the strip and reduces the surface roughness $R_a$ and/or $R_{max}$, and
removing the first chemically resistant coating from the amorphous metal strip, photochemical etching the amorphous metal strip by applying a second chemically resistant and lateral structured coating to the first main surface of the amorphous metal strip, etching through the non-coated areas of the amorphous metal strip from the first main surface with an appropriate etching fluid, wherein the second chemically resistant coating is chemically resistant to etching fluid for the length of the etching process, and forming at least one part from the amorphous metal strip.

22. A method according to claim 21, wherein the second chemically resistant and lateral structured coating is applied such that positions of plates to be etched from the amorphous metal strip are adjusted locally using results of the surface and/or cross-section inspection.

23. A method according to claim 21, wherein the surface is continuously inspected and a profile of the amorphous metal strip and the surface roughness are measured continuously or at discrete intervals using the profilometer.

24. A method for producing a metal strip, comprising:
providing an amorphous metal strip having a first main surface and a second, opposing main surface, inspecting a surface and/or cross-section of the first and/or the second main surface of the amorphous metal strip using an optical inspection system and/or a profilometer, wet chemical etching the entire first and second main surfaces of the amorphous metal strip;

after the wet-chemically etching the entire first and second main surfaces of the amorphous metal strip, covering at least parts of the first main surface and/or at least parts of the second main surface with a chemically resistant coating, wherein the chemically resistant coating is chemically resistant to etching fluid for the length of the etching process, wet-chemical etching at least one region of the first main surface which is not covered by the chemically resistant coating and/or at least one region of the second main surface which is not covered by the chemically resistant coating, wherein the etching removes at least a part of the amorphous metal strip and reduces the surface roughness $R_a$ and/or $R_{max}$, and removing the chemically resistant coating from the amorphous metal strip.

25. A method according to claim 24, wherein the surface is continuously inspected and a profile of the amorphous metal strip and the surface roughness are measured continuously or at discrete intervals using the profilometer.

26. A method for producing a metal strip, comprising:
providing an amorphous metal strip having a first main surface and a second, opposing main surface, inspecting a surface and/or cross-section of the first and/or the second main surface of the amorphous metal strip using an optical inspection system and/or a profilometer, wet chemical etching the entire first and second main surfaces of the amorphous metal strip; wherein the etching removes at least a part of the strip and reduces the surface roughness $R_a$ and/or $R_{max}$, and subsequently, photochemical etching the strip by applying a chemically resistant and lateral structured coating to the first main surface of the metal strip, etching through the non-coated areas of the metal foil from the first main surface with an appropriate etching fluid, wherein the chemically resistant coating is chemically resistant to etching fluid for the length of the etching process, and forming at least one part from the strip.

27. A method according to claim 26, wherein the chemically resistant and lateral structured coating is applied such that positions of a plate to be etched from the amorphous metal strip are adjusted locally using the results of the surface and/or cross-section inspection.

28. A method according to claim 26, wherein the surface is continuously inspected and a profile of the amorphous metal strip and the surface roughness are measured continuously or at discrete intervals using the profilometer.

* * * * *